US009734605B2

(12) United States Patent
Grasso

(10) Patent No.: US 9,734,605 B2
(45) Date of Patent: Aug. 15, 2017

(54) METHOD FOR PROCESSING DRAWINGS

(71) Applicant: Albert Grasso, Hammonton, NJ (US)

(72) Inventor: Albert Grasso, Hammonton, NJ (US)

(*) Notice: Subject to any disclaimer, the term of this patent is extended or adjusted under 35 U.S.C. 154(b) by 0 days.

(21) Appl. No.: 15/006,176

(22) Filed: Jan. 26, 2016

(65) Prior Publication Data

US 2016/0217598 A1    Jul. 28, 2016

Related U.S. Application Data

(60) Provisional application No. 62/108,823, filed on Jan. 28, 2015.

(51) Int. Cl.
*G06T 11/20* (2006.01)
*G06F 17/30* (2006.01)

(52) U.S. Cl.
CPC ...... *G06T 11/203* (2013.01); *G06F 17/30277* (2013.01)

(58) Field of Classification Search
CPC ....... G06T 11/40; G06T 11/203; G06T 17/00; G06T 11/001; G06T 11/00
USPC .......................................................... 345/441
See application file for complete search history.

(56) References Cited

U.S. PATENT DOCUMENTS

| | | | | |
|---|---|---|---|---|
| 7,707,220 B2* | 4/2010 | Bonabeau | ......... | G06F 17/30864 706/13 |
| 9,009,188 B1* | 4/2015 | Chechik | ............ | G06F 17/30247 382/305 |
| 2013/0000463 A1* | 1/2013 | Grover | ................... | G06Q 30/04 84/483.2 |

OTHER PUBLICATIONS

"The Connect-The-Dots Family of Puzzles: Design and Automatic Generation" (ACM Transactions on Graphics, vol. 33, No. 4, Article 72, Publication Date: Jul. 2014, by Maarten Loffler, Mira Kaisery, Tim van Kapelz, Gerwin Klappex, Marc van Kreveld, and Frank Staals).*

* cited by examiner

*Primary Examiner* — Ke Xiao
*Assistant Examiner* — Gordon Liu
(74) *Attorney, Agent, or Firm* — Global Intellectual Property Agency, LLC; Daniel Boudwin

(57) ABSTRACT

A method for processing drawings. The present invention can enhance a child's self-esteem and creativity by enabling them to create unique and imaginative works of art. First, a plurality of randomized markings are generated. A user makes linear connections between the markings, creating a user drawing. Next, a first database is queried to retrieve an outline that matches the user drawing. The outline is matched to the user drawing based on similarities and locations of general shapes used in both. Once the database has found a matching outline, a second database is queried to retrieve an image corresponding to the outline. The image is transmitted to a terminal where the user can then add additional elements, such as color, figures, text, and the like.

12 Claims, 4 Drawing Sheets

METHOD FOR PROCESSING DRAWINGS

CROSS REFERENCE TO RELATED APPLICATIONS

This application claims the benefit of U.S. Provisional Application No. 62/108,823 filed on Jan. 28, 2015. The above identified patent application is herein incorporated by reference in its entirety to provide continuity of disclosure.

BACKGROUND OF THE INVENTION

The present invention relates to computer graphics processing. More specifically, the present invention relates to a method for matching outlines from processed images with user drawings. It can be quite fun and entertaining for children to draw pictures such as cartoons and illustrations. However, it can be difficult to express one's creativity and artistic abilities using a standard coloring book. Further, some children may be discouraged without positive feedback about their creations and others may forgo drawing if their skills do not improve. Therefore, there is a need for a device application that can enhance an original drawing thereby providing positive feedback that will boost the confidence and self-esteem of the user.

In addition, traditional books having physical pages can lack sufficient paper to keep the attention of an individual. These traditional books also require the purchase and use of multiple writing instruments. Therefore, there is a need for a device application that allows an individual to create unique illustrations in a fun and easy manner while eliminating the risk of running out of a suitable canvas or the need for multiple writing instruments.

SUMMARY OF THE INVENTION

In view of the foregoing disadvantages inherent in the known types of computer graphics processing methods now present in the prior art, the present invention displays an image that corresponds to the general shapes in a user drawing. This provides the user with confidence and positive feedback because it appears as if the user drew the image. The present method comprises the steps of first generating a plurality of randomized markings and then receiving a user drawing comprising linear connections between the markings. Next, a first database is queried to retrieve an outline matching the user drawing. The outline and user drawing are matched based on a similar arrangement of general shapes.

Once the outline is retrieved from the first database, a second database is queried to retrieve an image corresponding to the outline. If more than one outline is matched to the user drawing, the user will have the option to select from the images that correspond to those outlines. The image is then transmitted to a terminal wherein the user can add additional elements to the image via the terminal.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
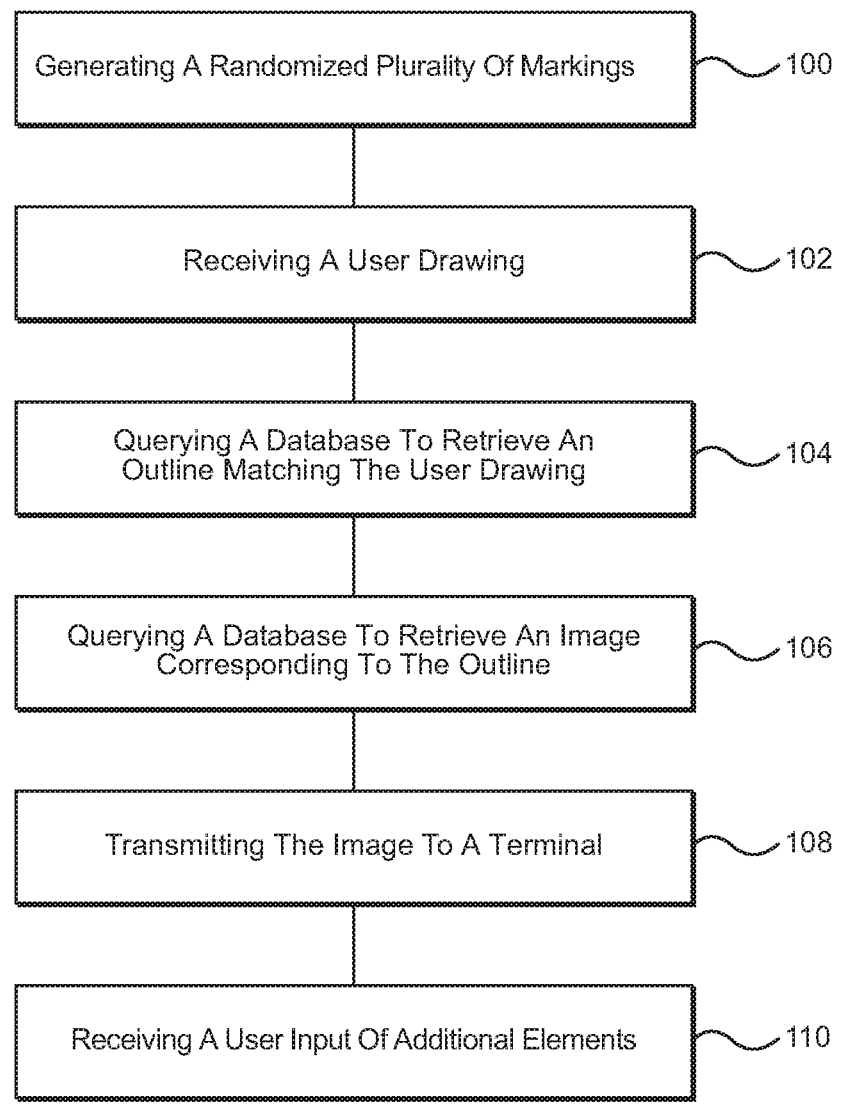
FIG. 1 shows a flowchart illustrating an embodiment of a method for processing drawings.

Reference is made herein to the attached drawings. Like reference numerals are used throughout the drawings to depict like or similar elements of the method for generating drawings. For the purposes of presenting a brief and clear description of the present invention, the preferred embodiment will be discussed as used for generating images based on linear connections between randomized markings. The figures are intended for representative purposes only and should not be considered to be limiting in any respect.

As used herein, "processor" refers to one or more devices, circuits, and/or cores configured to process data, such as a set of steps according to a computer program. Unless stated otherwise, a component such as a processor or interface described as being configured to perform a task includes both components temporarily configured to perform a task at a specified time and components manufactured to perform a task. As used herein, "logic" refers to (i) logic implemented as computer instructions and/or data within one or more computer processes and/or (ii) logic implemented in electronic circuitry. As used herein, "computer-readable medium" excludes any transitory signals, but includes any non-transitory data storage circuitry, e.g., buffers, cache, and queues, within transceivers of transitory signals.

The present invention is a method for processing drawings. The purpose of the present invention is to provide users with a mobile device or computer application that can be utilized to conduct a plurality of illustrations. This purpose is accomplished with the present method by generating a plurality of randomized markings, receiving a user drawing comprising linear connections between the markings, accessing a database storing images and outlines of those images, searching and matching an outline to the user drawing, and displaying the image that corresponds to the matched outline.

Referring now to FIG. 1, there is shown a flowchart illustrating an embodiment of a method for processing drawings. At 100, a plurality of randomized markings are generated. In one embodiment, a user input is used to generate the markings. For example, the user can tap on a screen of a mobile device and a resulting marking will be generated where the user touches the screen. In another embodiment, a processor generates a randomized arrangement of markings. In additional embodiments, a processor generates an arrangement of markings corresponding to beats of music played on the device.

Figure 2:
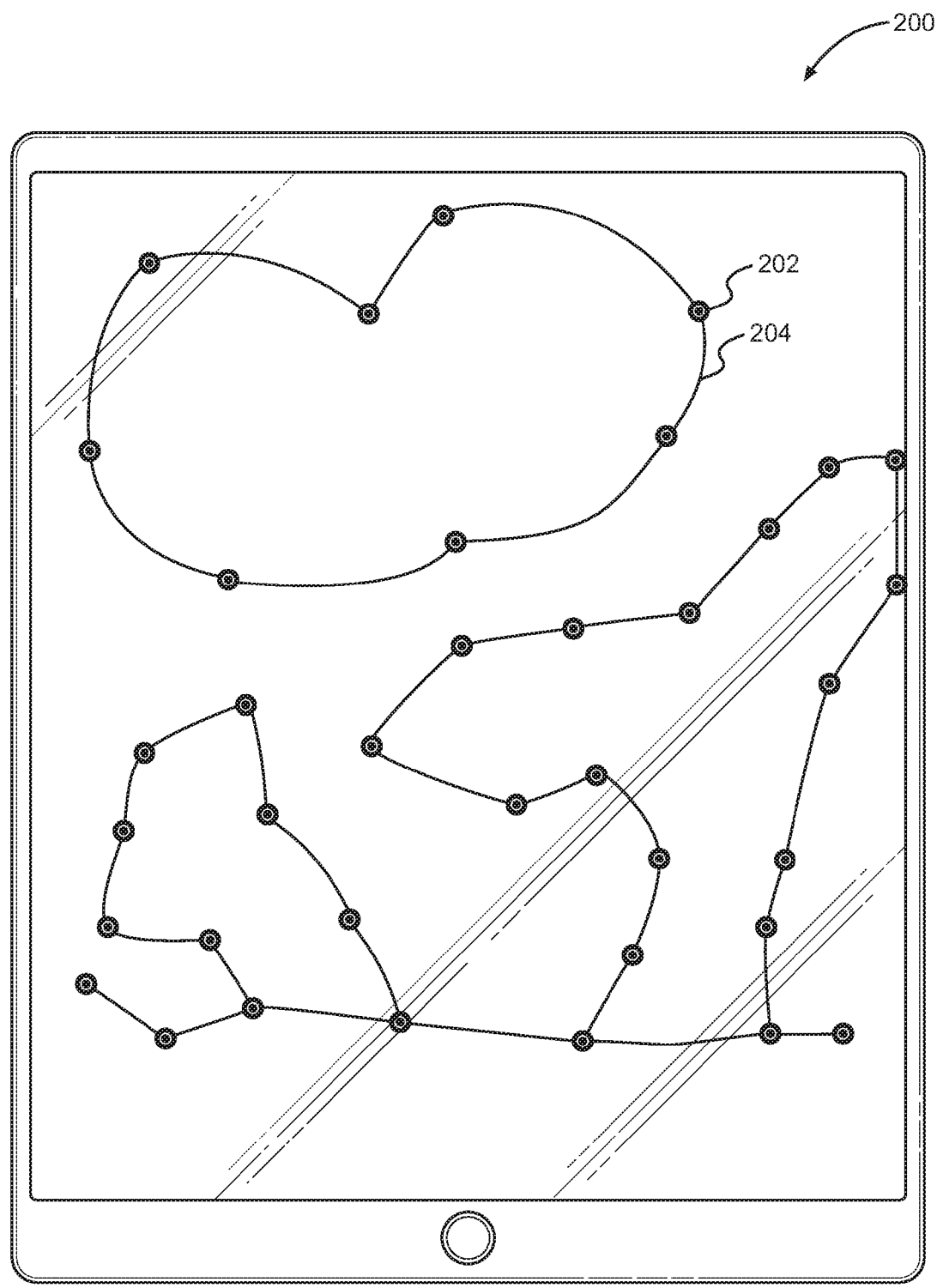
FIG. 2 shows a diagram illustrating an example of a user drawing.

At 102, a user drawing is received. The user drawing comprises one or more linear connections between the markings. In one embodiment, a user can make linear connections between the markings on a terminal of the mobile device, such as a touchscreen, in any way the user sees fit. For example, the linear connections between the markings are not limited to straight lines. Further, the markings can be connected in any order. For example, FIG. 2 shows a diagram illustrating a user drawing 200. In the depicted embodiment, the user drawing 200 comprises of linear connection 204 between randomized markings 202.

In one embodiment, after the user makes linear connections between the markings, the user can submit the user drawing via a terminal of the mobile device. For example, the user can press a button configured to submit the user drawing. In another example, the user can say a voice command into a microphone on the mobile device to submit the user drawing. Submitting the user drawing transmits the user drawing to the logic. In an alternative embodiment, the user drawing is automatically transmitted to the logic when all the markings are connected.

At 104, once the logic has received the user drawing, the logic queries a database to retrieve an outline matching the user drawing. In one embodiment, the outline is comprised of an arrangement of closed shapes. For example, the closed shape comprised of the linear connections 204 between the markings 202 in FIG. 2 matches the rounded closed shape 402 in the outline 400 shown in FIG. 3B. In another embodiment, the outline comprises closed shapes, open shapes, lines, and markings. In various embodiments, the user can transmit his or her own images to the logic via a terminal on the mobile device wherein the processor generates an outline for that image and stores the outline in the database.

Because a goal of the present method is to encourage creativity and enhance self-esteem, the processor does not require that the user drawing be an exact match to an outline. In one embodiment, the processor determines an outline matching the user drawing based on the similarities and locations of closed shapes. In alternative embodiments, the processor determines an outline matching the user drawing based on additional similarities, such as the location and size of open shapes, lines, and markings used in both.

Figure 3A:
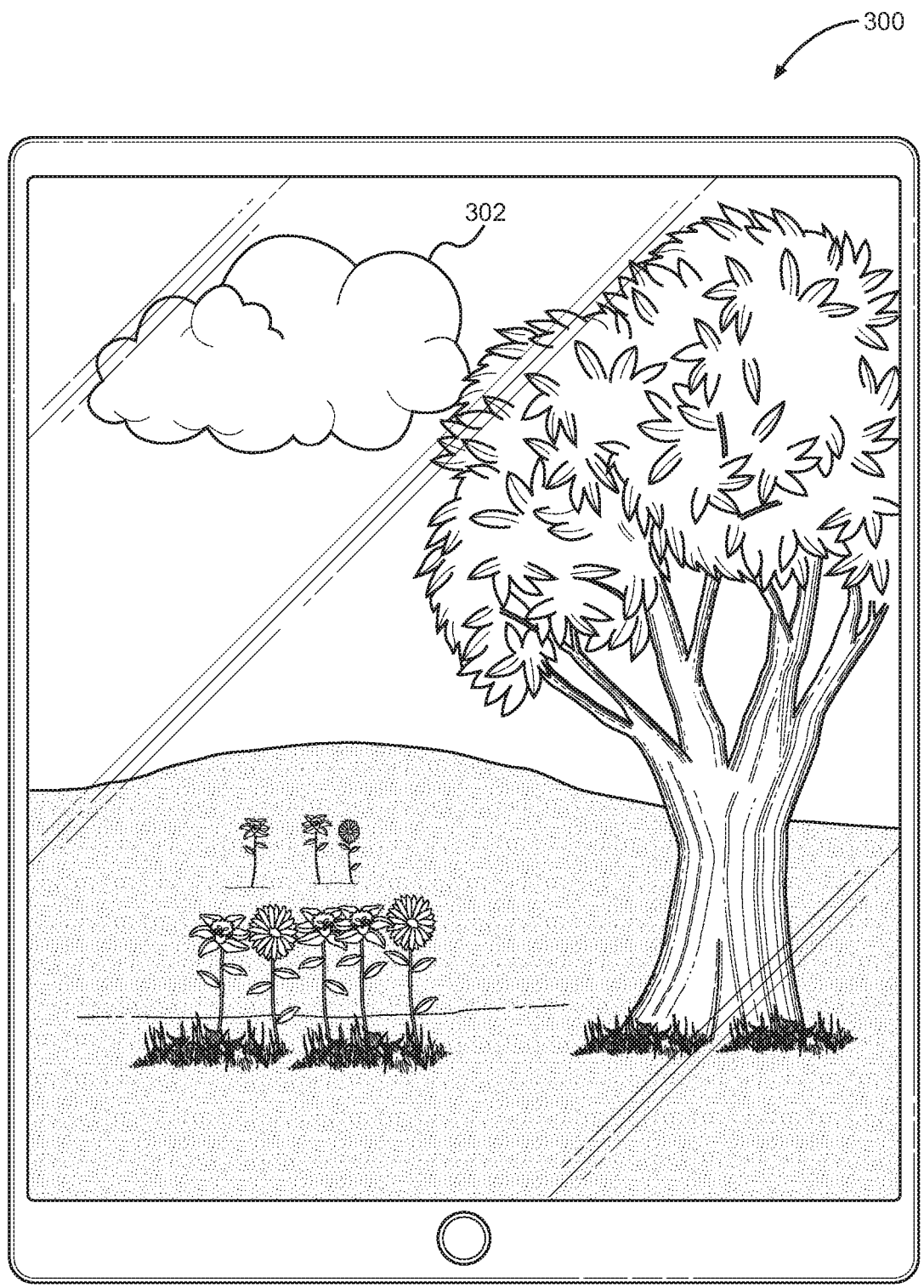
FIG. 3A shows a diagram illustrating an example of an image.
Figure 3B:
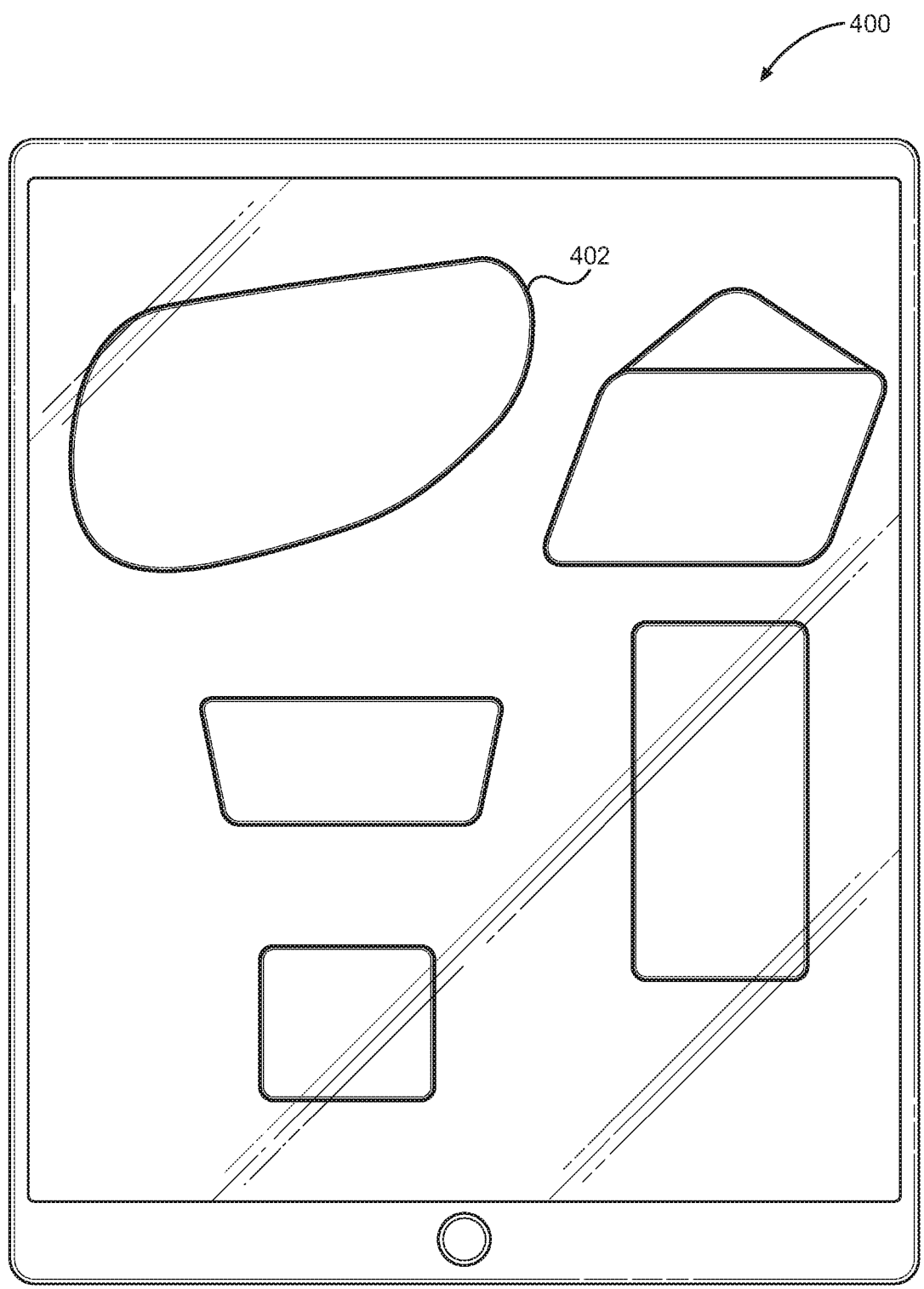
FIG. 3B shows a diagram illustrating an example of an outline.

At 106, the database is queried to retrieve an image corresponding to the matched outline. Each outline in the database corresponds to one or more images in the database. In one embodiment, the outline stored in the database is comprised of closed shapes, as shown in FIG. 3B, and the corresponding image in the database comprises a detailed graphic or photograph, as shown in FIG. 3A. For example, the outline 400 shown in FIG. 3B corresponds to the image 300 shown in FIG. 3A. The rounded shape 402 in FIG. 3B corresponds to the cloud 302 in the image 300 in FIG. 3A. In one embodiment where there are multiple outlines that can be matched to the user drawing, the user will be able to select from the images corresponding to the outlines.

At 108, the image is transmitted to a terminal on the mobile device. For example, the image is displayed on the screen of a mobile device. In various embodiments, at 110, the user can add other additional artistic elements, such as color, figures, text, or music, to the image. In one embodiment, the transmitted image lacks color. The user can add the element of color to the image through an input on the terminal. For example, the user could swipe his or her finger across the touchscreen of a mobile device or use a stylus in a similar manner.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic device comprising:
  a processor;
  a non-transitory computer readable medium operatively connected to the processor;
  a logic stored in the non-transitory computer readable medium that, when executed by the processor, causes the electronic device to perform a method, the method comprising the steps of:
  receiving a first input from a user, the first input comprising a plurality of randomized markings;
  receiving a second input from a user, the second input comprising one or more connecting lines, each connecting line comprising a starting point corresponding to a first randomized marking of the plurality of randomized markings and an ending point corresponding to a second randomized marking of the plurality of randomized markings;
  querying a database to retrieve an outline matching the second input;
  querying the database to retrieve an image corresponding to the outline; and
  transmitting the image to a terminal.

2. The method of claim 1, wherein the outline and the second input are matched based on similarities and locations of closed shapes in both the outline and the second input.

3. The method of claim 1, wherein the outline and the second input are matched based on the location and size of lines in both the outline and the second input.

4. The method of claim 1, further comprising the step of receiving a third user input of additional artistic elements.

5. A non-transitory computer readable medium that, when executed by a processor of an electronic device, causes the electronic device to perform a method, the method comprising the steps of:
  receiving a first input from a user, the first input comprising a plurality of randomized markings;
  receiving a second input from a user, the second input comprising one or more connecting lines, each connecting line comprising a starting point corresponding to a first randomized marking of the plurality of randomized markings and an ending point corresponding to a second randomized marking of the plurality of randomized markings;
  querying a database to retrieve an outline matching the second input;
  querying the database to retrieve an image corresponding to the outline; and
  transmitting the image to a terminal.

6. The method of claim 5, wherein the outline and the second input are matched based on based on similarities and locations of closed shapes in both the outline and the second input.

7. The method of claim 5, wherein the outline and user drawing are matched based on the location and size of lines in both the outline and the second input.

8. The method of claim 5, further comprising the step of receiving a third user input of additional elements.

9. A method for processing drawings, comprising:
receiving a first input from a user, the first input comprising a plurality of randomized markings;
receiving a second input from a user, the second input comprising one or more connecting lines, each connecting line comprising a starting point corresponding to a first randomized marking of the plurality of randomized markings and an ending point corresponding to a second randomized marking of the plurality of randomized markings;
querying a database to retrieve an outline matching the user drawing;
querying the database to retrieve an image corresponding to the outline; and
transmitting the image to a terminal.

10. The method of claim 9, wherein the outline and the second input are matched based on similarities and locations of closed shapes in both the outline and the second input.

11. The method of claim 9, wherein the outline and second input are matched based on the location and size of lines in both the outline and the second input.

12. The method of claim 9, further comprising the step of receiving a third user input of additional artistic elements.

* * * * *